Oct. 28, 1952  R. McFARLAND, JR  2,615,471
VALVE DIAPHRAGM

Filed March 28, 1949  2 SHEETS—SHEET 1

INVENTOR.
ROLLAND McFARLAND JR.
BY
Edward H. Sang
ATTORNEY

Oct. 28, 1952     R. McFARLAND, JR     2,615,471
VALVE DIAPHRAGM

Filed March 28, 1949     2 SHEETS—SHEET 2

INVENTOR.
ROLLAND McFARLAND JR.
BY
Edward H. Sang
ATTORNEY

Patented Oct. 28, 1952

2,615,471

UNITED STATES PATENT OFFICE 2,615,471

VALVE DIAPHRAGM

Rolland McFarland, Jr., Chicago, Ill., assignor to Hills-McCanna Company, Chicago, Ill., a corporation of Illinois Application March 28, 1949, Serial No. 83,930

6 Claims. (Cl. 137—793)

This invention relates to diaphragms for diaphragm valves. The invention is more particularly concerned with a new type of internal construction to eliminate mechanical weaknesses and service difficulties that have arisen in the past with diaphragms made by present methods. The invention is directed to diaphragms for use in weir type valves of the Saunders type, as exemplified by Patents No. 1,855,991 and No. 2,054,340, in which the diaphragm is adapted to be depressed against a raised weir, across the fluid passageway through the valve in order to close it.

At the present time, diaphragms for these valves are made of rubber base or synthetic elastomer base stocks, as exemplified by rubber, neoprene, Hycar, Butyl, polyvinyl chloride polymers, and similar materials. These materials, when compounded into diaphragm form, are made so that maximum advantage is taken of their properties of elastic deformation, recovery, resistance to absorption, and/or chemical resistance.

However, such materials require some type of internal, mechanical reinforcement to minimize excessive elastic deformation, permanent set or "cold flow," and to strengthen the diaphragm member against mechanical stresses imposed at valve closure, and to resist both mechanical and internal fluid pressures in the valve when the valve is in operation. For this purpose plies of heavy fabric, such as cotton duck, are placed between layers of rubber or other elastomer and the built-up layers molded or adhesively bound together to make an integrated diaphragm.

Further, it is usually necessary to incorporate in the diaphragm a metallic member in the form of a threaded stud which can be attached to the compressor of the valve, which compressor is in turn attached to the valve stem so that the position and travel of the diaphragm can be controlled between the full closed position and the full open position.

With the conventional diaphragm construction it has been difficult to prevent the steel stud from pulling free from the diaphragm member, either because of sticking of the diaphragm to the valve weir when the valve is in closed position, or when the valve was used in a vacuum line. Further, because of the method of plying-up the various layers of rubber stock and fabric, inconsistent quality diaphragms were produced because of uncontrolled factors in manufacturing, such as delays between the build-up operation, room temperature curing of cement between the diaphragm plies, auto-curing, bloom, or migration of the uncured rubber layers, delay in sequence of operation of manufacturing, and lack of consistent performance during various labor operations in the diaphragm build-up and fabrication.

Further difficulty has occurred because of improper positioning and location of the fabric plies or inserts in the bodies of the diaphragms, and particularly with the fabric inserts which extend throughout the body of the diaphragm and under the stud head. Hence, where excessive closing force or torque is inadvertently applied to the valve hand-wheel, sufficient internal stress is set up in the diaphragm, particularly in that area under the stud head, to cause these fabric inserts to rupture and split. The diaphragm is then weakened, this area loses all reinforcement and further, heavy closure can rupture or split the diaphragm on the liquid side (that side of the diaphragm which contacts the fluid flowing through the valve).

Various special stud head designs, and metal reinforcing members have been molded into the nubbin area to prevent the stud head from pulling out of the hole surrounding the stud shank. In the majority of instances these various designs were unsuccessful, because of lack of adhesion between the metal members and the surrounding elastomer, or because of severe pinching action between the stud head, and the metallic member covering the stud head, which caused the elastomer in this area to crack under compressive stress, and permit the entire assembly of stud and metal guard to pull loose. These various reinforcing metal members, or special studs, resulted in excessive costs of producing these members, as well as increased costs in inserting them and molding them into the nubbin section of the diaphragm.

Analysis of the problem showed that any fabric lying on or under the neutral axis of the diaphragm, and lying also under the stud head, invariably ruptured under excessive diaphragm closure. This has been due to the fact that excessive force is always created, during closure, in that area under the stud head. It was not found possible, however, to provide a sufficient thickness of fabric or to reduce sufficiently stress or distortion in the fabric, to prevent the rupturing of the fabric when it was located in this area.

It is necessary, however, to provide some type of fabric insert under the stud head, so as to act as a "floor" to bear the greater portion of stress imparted by the stud head in diaphragm closure, and further to distribute this stress of the stud head to a sufficient extent to prevent failure of the underlying elastomeric stock in this area, because of excessive compressive stress imposed on this elastomeric material, directly from the stud head.

It was discovered that sufficient reinforcing action for mechanical pressure and fluid pressure requirements could be achieved by locating the ply or plies of fabric above the stud head and above the neutral axis of the diaphragm, so that during closing stress this fabric is free of the high compressive stress under the stud head and is never sufficiently stretched and distorted to the point of failure. Further, it was found possible to provide a satisfactory "floor" or stress distributing member for compressive stress resulting from the stud head in closure, by utilizing one or more floating discs of fabric which could be placed immediately below the stud head. In this way, the stress distribution of these fabric discs could be immediately taken advantage of, and further, the use of fabric discs under the stud head permitted unrestrained distribution of stress, which could be effectively absorbed without fracture.

The re-location of the fabric inserts in the diaphragm made it possible to utilize a thick calendered unreinforced elastomer section for the lower portion of the diaphragm in that area constituting the liquid side of the diaphragm.

With the old location of the fabric layers under the stud head and in that area underneath the neutral axis of the diaphragm, it was always necessary to build the portion of the liquid side of the diaphragm through tedious lamination and adhesion of multiple layers of thin elastomeric stock, until a sufficient thickness was built up to reach the first fabric insert, lying below the neutral axis of the diaphragm. Because of the large amount of hand labor involved, a large number of defective diaphragms were produced, which diaphragms failed prematurely in service.

All fluids are absorbed to a greater or lesser degree in elastomeric materials. This absorption takes place at various rates of time, and this absorption will ultimately result in reaching those points of cementation or adherence of the elastomeric layers, as one proceeds from the outer face of the diaphragm liquid side to the diaphragm interior, and then to the first fabric reinforcement in the diaphragm. As a result, in those diaphragms consisting of multiple thin layers of stock in this area, the phenomena of absorption will, in most instances, eventually reach these multiple points of adhesion, weaken them, or destroy them entirely, and the diaphragm quickly fails in service.

By freeing the lower portion of the diaphragm from fabric inserts, it was found possible to utilize a thick, heavy and homogeneous layer of stock which can be made on standard rubber calendering machines, to produce in sheet form a heavy and sound lower member which is free of layers or points of adhesion, thereby eliminating the drawbacks inherent in diaphragms as heretofore fabricated.

One of the objects of this invention, therefore, is to provide a method of anchoring the stud head in a valve diaphragm in such manner that it will not pull out during normal operation in service, or while the valve is functioning under vacuum.

Another object of this invention is to re-locate the fabric inserts in the diaphragm so that the possibility of fracturing these fabric inserts is reduced.

Still another object of this invention is to devise a method of manufacture wherein manual operations are reduced to a minimum in the diaphragm build-up operation, thereby producing on the diaphragm liquid side, a region of material which is absolutely sound and not susceptible to loss of adhesion or to delamination when the diaphragm is in service or prior to vulcanization in the mold.

The objects of this invention are more clearly apparent from the following description and accompanying drawings, of which Figure 1 is a plan view of the diaphragm looking at the top side (compressor or dry side) of the diaphragm with portions laid back to show the fabric layer beneath it;

Figure 5:
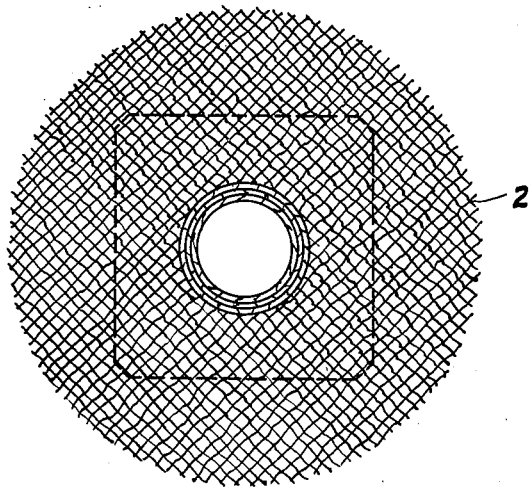
Figure 5 is an enlarged, plan view looking at the top-most fabric ply or button.

Referring to the drawings, 1 is the compressor side of the diaphragm consisting of a layer of natural rubber or synthetic elastomer. The button of fabric 2 is cemented in place immediately below elastomer layer, and contains an awl hole at its center as more clearly shown in Figure 5 to accommodate stud shank 3. 4 is a fabric insert below button 2, extending throughout the diaphragm and also having an awl hole at its center to accommodate the stud shank 3. The fabric ply 4 is cemented between thin layers of elastomer.

Figure 2:
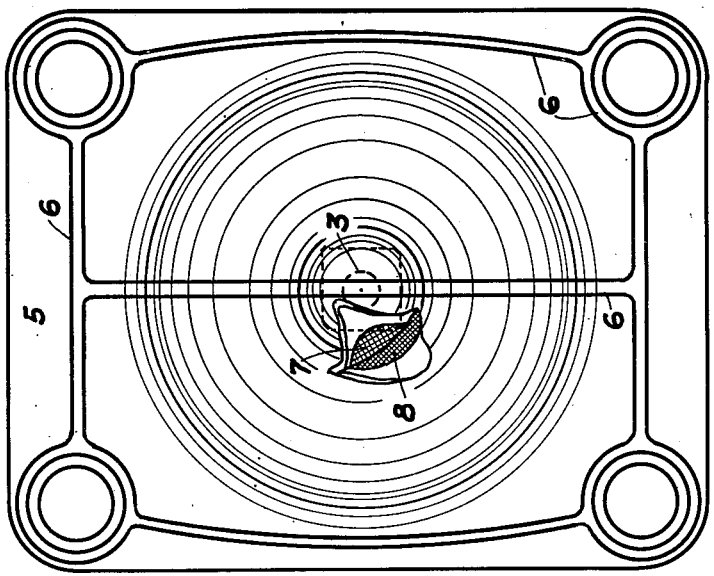
Figure 2 is a plan view of the novel diaphragm looking at the under or liquid side thereof, with a portion turned back to show the fabric insert.

Referring more particularly to Figure 2, 5 is the liquid face (wetted side) of the diaphragm. 6 is the sealing bead on the diaphragm liquid face, described and shown in Patent 2,302,930 to insure a liquid-tight seal when the diaphragm is bolted between the flanges of the valve body and valve bonnet and closed against the valve weir. A portion of the bottom face of the diaphragm is turned back to show two superimposed discs of fabric 7 and 8 cemented in the diaphragm immediately below the stud head 8' and immediately above neutral axis 9 of the diaphragm. As is apparent from the drawing, buttons 2, 7 and 8 are of greater area than stud head 8', but smaller in area than the bowl portion of the diaphragm.

Figure 3:
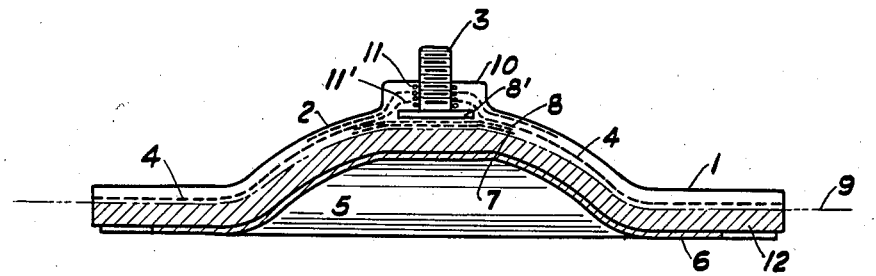
Figure 3 is a vertical sectional view of the diaphragm taken along the line 3—3 of Figure 1.
Figure 4:
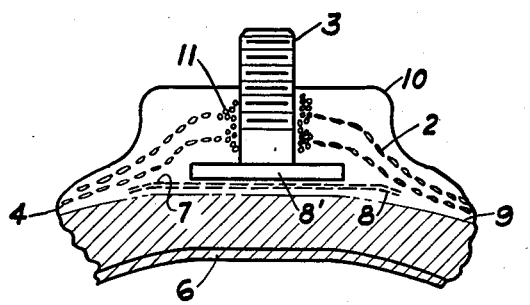
Figure 4 is an enlarged, fragmentary view of the center portion of the section shown in Figure 3.

Figure 3 is enlarged to show the new location of the fabric insert, the extent of calendered (machine-made) portion of the diaphragm on the liquid side, and also the location of the two floating discs of fabric 7 and 8 under the stud head. As shown in this figure, fabric insert 4 lies above the neutral axis 9 of the diaphragm. 10 is the nubbin area of the diaphragm. 11 and 11' represent collars formed by the piled or bunched fabric cords resulting from displacement by a sharp pointed awl of the fibers of button 2 and overlying fabric ply 4 to the side to make a circular passage for the stud shank 3. 12 is the machine-made (calendered) thick section of rubber or elastomer stock constituting the diaphragm liquid side (wetted side).

The construction of the awl holes and the deformation of the fibers of the fabric as produced under the new method, with the bunching of the fibers around the stud shank 3 results in a high-strength collar of reinforcement, which greatly diminishes the probability of the stud head pulling out of the diaphragm, either by reason of mechanical abuse, or the application of vacuum to the valve. The method heretofore used consisted in punching a hole or holes in the fabric insert, which holes were of such a diameter as to easily clear the diameter of the stud shank. This practice resulted in discontinuous fibers in the fabric surrounding the hole and resulted in no reinforcement in this area, so that under stress, the cut ends of the fabric further tore apart, no reinforcement of the elastic stock was obtained in this area, and the stud head could then "snap through" the elastic nubbin section.

By using an awl hole in the fabric 11, and relying upon the unbroken cord or strands of the fabric to produce a reinforcing collar of fibers 11 and 11' around the stud shank and over the stud head 8', satisfactory anchoring of the stud head is achieved. This beneficial effect is further enhanced by using a plurality of fabric inserts over the stud head with these fabric inserts utilizing the "awl hole" design, to pass the stud shank 3, and yet give the proper reinforcing action to the stud head 8', to prevent the stud head from pulling through the awl holes in the fabric cloth. Although I have shown only two layers of fabric through which the stud passes, additional layers may be used, particularly on larger size diaphragms.

Because of the reinforcing effect of the fiber collars 11 and 11' resulting from displacing the warp and woof to one side to produce an awl hole for passing the stud shank 3, it is possible to take advantage of the anchored area of the entire diameter of the fabric inserts 2 and 4, when these are cemented and adhered to the layers of elastomer lying on either side of the fabric inserts. Further, when stress is put upon the stud shank 8', the initial load to pull out the stud head is carried by the fabric collars 11 and 11', which in turn permit the distribution of the stress throughout the anchored area of the fabric inserts.

Comparative tests of the standard diaphragms made by the old method, of experimental diaphragms incorporating special metallic anchoring members for the stud in the nubbin area, and of diaphragms produced with the "awl hole" fabric collar anchorage in accordance with this invention showed that the awl hole gave superior performance, and exhibited greater resistance to pull-out loads when the studs were forcibly pulled from the main body of the diaphragm.

The number of fabric inserts is not limited to those shown, but instead, a plurality of fabric inserts can be used, particularly on diaphragms of larger size, but regardless of the number of fabric inserts used, they should be arranged in a similar manner and in the locations shown and described.

Figure 1:
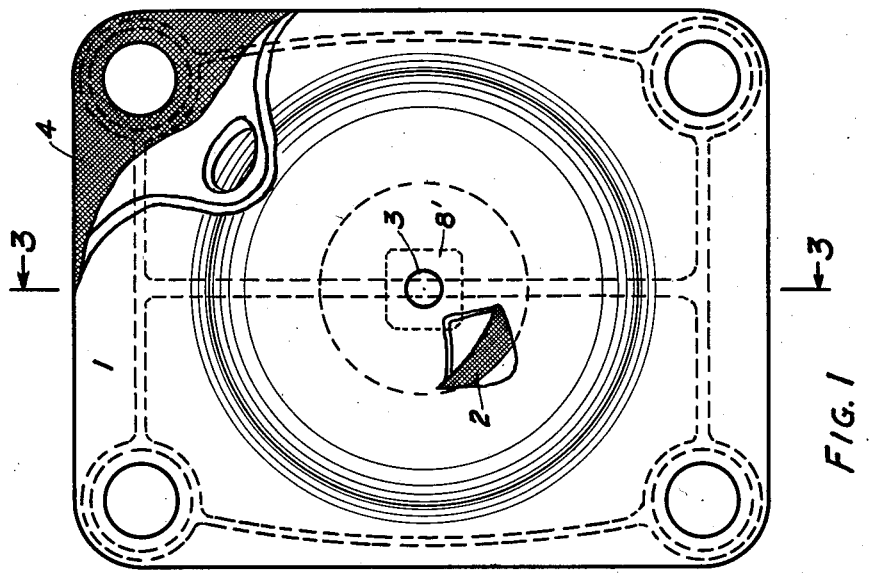

The diaphragm shown in Figures 1, 2 and 3 is an actual size diaphragm for a 2-inch valve. It will be seen that the thick calendered portion 12 lying below the neutral axis 9 constitutes the major thickness of the diaphragm except at the nubbin.

Diaphragms constructed in accordance with this invention are, after being assembled, molded under heat and pressure to give the shape shown in the drawings in the same manner as is done with conventional diaphragms.

It will be seen, therefore, that by this new internal construction in the diaphragm, that I am able to mold diaphragms which are not susceptible to loss of adhesion and delamination in that area adjacent to the diaphragm liquid side and that I am able to mold diaphragms such that the fiber collar surrounding the stud shank now eliminates to a large degree the former difficulty of the stud pulling free from the main body of the diaphragm.

As used in the claims, the term "elastomer" applies to natural rubber or artificial products having elastic properties similar to rubber.

I claim:

1. A valve diaphragm made of elastomer and for use in connection with a valve having a weir between its inlet and outlet, said diaphragm having a central bowl-shaped portion, a stud having its head embedded in the center of said diaphragm and its shank protruding therefrom, woven fabric discs of greater cross-sectional area than said stud head, but of lesser area than said bowl-shaped portion immediately adjacent and underlying the stud head to absorb compressive load from the stud head when the diaphragm is in a closed position and impressed upon a valve weir, and at least one woven fabric insert above said stud head the fibers of which are spread apart and unruptured around the stud shank in order to form a reinforcing collar through which said shank passes.

2. A flexible diaphragm having a stud with the head thereof embedded in the diaphragm, said diaphragm comprising an elastomer having at least one layer of fabric covering substantially the entire area of the diaphragm, embedded therein above the stud head, at least one additional woven fabric insert in said diaphragm above said stud head and immediately surrounding the stud shank, the area of said last mentioned insert being a minor fraction of the area of said diaphragm, but substantially greater than the area of the stud head, said fabric layer and insert having their fibers spread apart at their centers to form openings surrounded by unruptured fibers through which the stud shank passes.

3. A flexible diaphragm having a stud, the head of which is embedded in the center of said diaphragm, said diaphragm comprising a relatively thick nonlaminated elastomer bottom portion, a plurality of alternate fabric and thinner elastomer layers adhesively bound to said bottom portion, at least one of said fabric layers, having an area at least as large as that of said stud head but only a small fraction of the area of the diaphragm, lying immediately beneath said stud head, and at least one woven fabric layer of substantially the same area as said diaphragm overlying said stud head, said last mentioned fabric layer having a hole therethrough to accommodate the stud shank, but smaller than said stud head, the fibers of said fabric being unruptured and continuous adjacent said hole.

4. A flexible valve diaphragm having a central bowl-shaped portion, comprising a thick ply of elastomer, at least two thinner plies of elastomer of substantially the same area as said thick ply, a nubbin formed at the center of the outermost thin elastomer ply, a woven fabric insert immediately beneath the outermost thin elastomer ply and of lesser area than said bowl-shaped portion, a woven fabric insert, of substantially the same area as said elastomer plies, between the inner thin elastomer plies, a stud having its head buried in said diaphragm at its center with the stud shank passing through holes in said two first mentioned fabric inserts surrounded by fibers, all of which are continuous and unruptured from edge to edge of said inserts, and protruding through said nubbin, and at least two woven fabric inserts immediately below the stud head, the area of said last mentioned inserts being larger than said stud head, but less than that of said bowl-shaped portion.

5. A diaphragm in accordance with claim 3 in which the fibers adjacent said hole are bunched together to form a collar surrounding said shank.

6. A valve diaphragm comprising an elastomer having at least one woven fiber insert, the threads or fibers of said insert adjacent the center of said insert being forced apart to form a hole of sufficient size to accommodate the shank of a stud passing therethrough and having its head anchored in said diaphragm, all the fibers which are adjacent to said shank being continuous and unbroken and being bunched together to form a reinforcing collar fitting snugly around said shank.

ROLLAND McFARLAND, JR.

REFERENCES CITED

The following references are of record in the file of this patent:

UNITED STATES PATENTS

| Number | Name | Date |
| --- | --- | --- |
| 2,324,880 | Rogers | July 20, 1943 |